United States Patent
Bartolucci et al.

(10) Patent No.: US 12,273,455 B2
(45) Date of Patent: Apr. 8, 2025

(54) COMPUTER-IMPLEMENTED SYSTEMS AND METHODS FOR LINKING A BLOCKCHAIN TO A SET OF DIGITAL TWINS

(71) Applicant: nChain Licensing AG, Zug (CH)

(72) Inventors: Silvia Bartolucci, London (GB); Simone Madeo, London (GB)

(73) Assignee: NCHAIN LICENSING AG, Zug (CH)

( * ) Notice: Subject to any disclaimer, the term of this patent is extended or adjusted under 35 U.S.C. 154(b) by 213 days.

(21) Appl. No.: 16/761,211

(22) PCT Filed: Oct. 23, 2018

(86) PCT No.: PCT/IB2018/058258
§ 371 (c)(1),
(2) Date: May 1, 2020

(87) PCT Pub. No.: WO2019/087007
PCT Pub. Date: May 9, 2019

(65) Prior Publication Data
US 2020/0295942 A1    Sep. 17, 2020

(30) Foreign Application Priority Data

Nov. 2, 2017   (GB) .................................... 1718182
Nov. 20, 2017  (GB) .................................... 1719212
Mar. 23, 2018  (GB) .................................... 1804744

(51) Int. Cl.
*H04L 9/00*    (2022.01)
*G06F 16/27*   (2019.01)
(Continued)

(52) U.S. Cl.
CPC ............ *H04L 9/3215* (2013.01); *G06F 16/27* (2019.01); *G06F 21/64* (2013.01); *H04L 9/0637* (2013.01);
(Continued)

(58) Field of Classification Search
CPC ... H04L 9/3215; H04L 9/0637; H04L 9/0891; H04L 9/3236; H04L 9/3239;
(Continued)

(56) References Cited

U.S. PATENT DOCUMENTS 4,918,589 A    4/1990   Floro et al.
5,034,686 A    7/1991   Aspelin
(Continued)

FOREIGN PATENT DOCUMENTS

CN    105812126 A    7/2016
CN    106022681 A    10/2016
(Continued)

OTHER PUBLICATIONS

Angrish et al., "A Flexible Data Schema and System Architecture for the Virtualization of Manufacturing Machines (VMM)," 2017, 3 pages.
(Continued)

*Primary Examiner* — Kevin Ayala
(74) *Attorney, Agent, or Firm* — Tarolli, Sundheim, Covell & Tummino LLP

(57) ABSTRACT

A blockchain that can be used to generate an immutable transaction history of data produced by the set of digital twins. In the case of an error or failure, parties of interest can then access and analyze an immutable record of data. The invention may be used in conjunction with the Bitcoin blockchain or another blockchain protocol.

16 Claims, 9 Drawing Sheets

(51) Int. Cl.
*G06F 21/64* (2013.01)
*H04L 9/06* (2006.01)
*H04L 9/08* (2006.01)
*H04L 9/32* (2006.01)
*G06Q 20/38* (2012.01)

(52) U.S. Cl.
CPC .......... *H04L 9/0891* (2013.01); *H04L 9/3236* (2013.01); *H04L 9/3239* (2013.01); *H04L 9/3297* (2013.01); *G06Q 20/389* (2013.01); *H04L 9/50* (2022.05)

(58) Field of Classification Search
CPC ......... H04L 9/3297; H04L 9/50; G06F 16/27; G06F 21/64; G06F 30/20; G06Q 20/389; G06Q 10/067
See application file for complete search history.

(56) References Cited

U.S. PATENT DOCUMENTS

| | | | |
|---|---|---|---|
| 5,801,938 | A | 9/1998 | Kalantery |
| 9,426,185 | B1 * | 8/2016 | Vora ..................... H04L 63/0492 |
| 11,050,690 | B2 * | 6/2021 | Hong ..................... H04L 51/10 |
| 11,080,665 | B1 | 8/2021 | Poelstra et al. |
| 11,514,448 | B1 | 11/2022 | Liberman |
| 2010/0070674 | A1 | 3/2010 | Campbell |
| 2011/0157473 | A1 | 6/2011 | Choi et al. |
| 2013/0069772 | A1 | 3/2013 | Najafi et al. |
| 2015/0213122 | A1 * | 7/2015 | Neumeier ........ H04N 21/23424 707/698 |
| 2016/0098723 | A1 * | 4/2016 | Feeney ................ G06Q 20/065 705/75 |
| 2016/0134593 | A1 | 5/2016 | Gvili |
| 2016/0164884 | A1 | 6/2016 | Sriram et al. |
| 2016/0261404 | A1 * | 9/2016 | Ford ..................... H04L 67/104 |
| 2016/0321654 | A1 | 11/2016 | Lesavich et al. |
| 2016/0357686 | A1 * | 12/2016 | Waldspurger ....... G06F 12/1018 |
| 2017/0147975 | A1 | 5/2017 | Natarajan et al. |
| 2017/0163733 | A1 | 6/2017 | Grefen et al. |
| 2017/0173262 | A1 | 6/2017 | Veltz |
| 2017/0235970 | A1 | 8/2017 | Conner |
| 2017/0262862 | A1 | 9/2017 | Aljawhari |
| 2017/0284974 | A1 | 10/2017 | Hershey et al. |
| 2017/0287090 | A1 | 10/2017 | Hunn et al. |
| 2017/0307387 | A1 | 10/2017 | Kohlhepp |
| 2017/0310747 | A1 | 10/2017 | Cohn et al. |
| 2017/0364908 | A1 | 12/2017 | Smith et al. |
| 2017/0366347 | A1 | 12/2017 | Smith |
| 2018/0001183 | A1 | 1/2018 | Tran et al. |
| 2018/0007131 | A1 | 1/2018 | Cohn et al. |
| 2018/0017447 | A1 | 1/2018 | Raj et al. |
| 2018/0063709 | A1 | 3/2018 | Morrison |
| 2018/0082043 | A1 * | 3/2018 | Witchey ................. G16H 10/40 |
| 2018/0094953 | A1 | 4/2018 | Colson et al. |
| 2018/0115428 | A1 * | 4/2018 | Lysenko ............... H04L 9/0637 |
| 2018/0117446 | A1 | 5/2018 | Tran et al. |
| 2018/0139056 | A1 | 5/2018 | Imai et al. |
| 2018/0139278 | A1 | 5/2018 | Bathen et al. |
| 2018/0144147 | A1 * | 5/2018 | Nix ....................... H04W 12/35 |
| 2018/0173372 | A1 * | 6/2018 | Greenspan .......... G06F 16/2465 |
| 2018/0227277 | A1 * | 8/2018 | Fischer ............... H04W 12/106 |
| 2018/0264347 | A1 | 9/2018 | Tran et al. |
| 2019/0114182 | A1 * | 4/2019 | Chalakudi .......... H04L 63/0435 |
| 2019/0171187 | A1 | 6/2019 | Cella et al. |
| 2019/0266146 | A1 * | 8/2019 | Rose ..................... G06F 16/215 |
| 2020/0225655 | A1 | 7/2020 | Cella et al. |
| 2020/0348662 | A1 | 11/2020 | Cella et al. |
| 2021/0081938 | A1 * | 3/2021 | Falk ..................... H04L 9/3247 |
| 2021/0157312 | A1 | 5/2021 | Cella et al. |
| 2023/0186201 | A1 | 6/2023 | Cella et al. |

FOREIGN PATENT DOCUMENTS

| | | |
|---|---|---|
| CN | 107122985 A | 9/2017 |
| CN | 107194822 A | 9/2017 |
| CN | 107301501 A | 10/2017 |
| EP | 3382616 A1 | 10/2018 |
| GB | 2551643 A | 12/2017 |
| JP | H11177623 A | 7/1999 |
| JP | 2006279179 A | 10/2006 |
| JP | 2009081564 A | 4/2009 |
| KR | 20160127878 A | 11/2016 |
| WO | 2017165909 A1 | 10/2017 |
| WO | 2017187397 A1 | 11/2017 |
| WO | 2017198891 A1 | 11/2017 |
| WO | 2017201489 A1 | 11/2017 |
| WO | 2017220115 A1 | 12/2017 |
| WO | 2018026727 A1 | 2/2018 |
| WO | 2018037148 A1 | 3/2018 |

OTHER PUBLICATIONS

Anonymous, "What is Blockchain Technology? A Step-by-Step Guide for Beginners," retrieved from https://web.archive.org/web/20171016062654/https://blockgeeks.com/guides/what-is-blockchain-technology/, Oct. 16, 2017, 12 pages.

Antonopoulos, "Mastering Bitcoin—Unlocking Digital Cryptocurrencies," O'Reilly Media, Inc., Dec. 20, 2014, 282 pages.

Blechschmidt, "Digital Twin on Blockchain," Cognizant Business Consulting, Jun. 2017, 15 pages.

Blockgeeks, "What is Blockchain Technology? A Step-by-Step Guide For Beginners," retrieved from https://web.archive.org/web/20171016062654/https://blockgeeks.com/guides/what-is-blockchain-technology/, Oct. 16, 2017, 2 pages.

Cpchain, "Decentralized Infrastructure for Next Generation Internet of Things," Jan. 10, 2018, 34 pages.

Datta, "Emergence of Digital Twins—Is This the March of Reason?," Journal of Innovation Management, 2017, 20 pages.

Gutierrez, "Boeing Improves Operations with Blockchain and the Internet of Things," retrieved from https://www.altoros.com/blog/boeing-improves-operations-with-blockchain-and-the-internet-of-things/, May 24, 2017, 12 pages.

International Search Report and Written Opinion for Application No. PCT/IB2018/058256, mailed Jan. 31, 2019, filed Oct. 23, 2018, 15 pages.

International Search Report and Written Opinion mailed Feb. 1, 2019, Patent Application No. PCT/IB2018/058258, 14 pages.

International Search Report and Written Opinion mailed Mar. 29, 2019, Patent Application No. PCT/IB2018/058258, 20 pages.

IPLD, "IPLD" retrieved from https://web.archive.org/web/20170921113308/http://ipld.io/, Sep. 21, 2017, 10 pages.

Jaffey, "MQTT and CoAP, IoT Protocols," Eclipse News Letter, retrieved from https://web.archive.org/web/20170731183138/http://www.eclipse.org/community/eclipse_newsletter/2014/february/article2.php, Jul. 31, 2017, 5 pages.

Jim, "Journal of Innovation Management—The International Journal on Multidisciplinary Approaches on Innovation," retrieved from https://repositorio-aberto.up.pt/handle/10216/107952, Oct. 30, 2017, 161 pages.

Keane, "Trust Your Odometer? Blockchain Test Aims to Turn Tide on Car Tampering," retrieved from https://www.coindesk.com/markets/2017/07/21/trust-your-odometer-blockchain-test-aims-to-turn-tide-on-car-tampering/, Jul. 21, 2017, 6 pages.

LG, "MQTT, Node-RED & Blockchain," baumann.at, Oct. 17, 2017, 3 pages.

Lin et al., "Blockchain: The Evolutionary Next Step for ICT E-Agriculture," Environments, 2017, 13 pages.

Ly at al., "If An IoT Device's is Unable to Store its Data to the Ledger Due to the Size Limitation, What Will Happen?," Quora, https://www.quora.com/lf-an-loT-device%E2%80%99s-is-unable-to-store-its-data-to-the-ledger-due-to-the-size-limitation-what-will-happen, 2017, 6 pages.

Makers, "#1 Meetup: IOTA and its Practical Application in the Automotive Industry," https://www.youtube.com/watch?v=SVTOHdrsJ-U, Sep. 25, 2017, 24 pages.

Nakamoto, "Bitcoin: A Peer-to-Peer Electronic Cash System," Bitcoin, Oct. 31, 2008, https://bitcoin.org/bitcoin.pdf, 9 pages.

(56) References Cited

OTHER PUBLICATIONS

Quaddah et al., "FairAccess: a new Blockchain based access control framework for the Internet of Things," Security and Communication Networks 9(18):5943-5964, Feb. 2017, https://www.researchgate.net/publication/313847688_FairAccess.
Satoshi et al., "Connection Limits," Bitcoin Forum, Aug. 9, 2010, https:/bitcointalk.org/index.php?topic=741.0; prev_next=prev, 2 pages.
Shafagh et al., "Towards Blockchain-based Auditable Storage and Sharing of IoT Data," Nov. 14, 2017, 6 pages.
Sharma et al., "A Software Defined Fog Node Based Distributed Blockchain Cloud Architecture for IoT," IEEE Access, Sep. 29, 2017, 10 pages.
Sheridan, "Digitizing Vehicles: The First Blockchain-Backed Car Passport," BigchainDB Blog, https://blog.bigchaindb.com/digitizing-vehicles-the-first-blockchain-backed-car-passport-b55ead6dbc71, Mar. 24, 2017, 5 pages.
Sogeti Labs, "IoT Security Using Blockchain," retrieved from https://labs.sogeti.com/iot-security-using-blockchain/, May 31, 2017, 13 pages.
Stöcker, "Implementing First Industry 4.0 Use Cases with SAG Tangle Machine Tagging for Digital Twins," retrieved from https://cstoecker.medium.com/implementing-first-industry-4-0-use-cases-with-iota-dag-tangle-machine-tagging-for-digital-twins-baf1943c499d, Jun. 24, 2017, 9 pages.
Trouton et al., "3D Opportunity for Blockchain," Deloitte University Press, 2016, 20 pages.
UK Commercial Search Report mailed Feb. 15, 2018, Patent Application No. GB1718182.7, 12 pages.
UK Commercial Search Report mailed Feb. 16, 2018, Patent Application No. GB1719212.1, 15 pages.
UK IPO Search Report mailed May 1, 2018, Patent Application No. GB1718182.7, 5 pages.
UK IPO Search Report mailed May 1, 2018, Patent Application No. GB1719212.1, 5 pages.
UK IPO Search Report mailed May 1, 2018, Patent Application No. GB1804744.9, 5 pages.
Van Der Ploeg, "Releasing the Potential of Blockchain—Why Unchain.io?," Sep. 7, 2017, 2 pages.
Zyskind et al., "Decentralizing Privacy: Using a Blockchain to Protect Personal Data," 2015 IEEE CS Security and Privacy Workshops, May 21, 2015, 5 pages.
Heber et al., "Towardsw a Digital Twin: How the Blockchain Can Foster E/E-traceability in Consideration of Model-Based Systems Engineering," International Conference on Engineering Design, Aug. 21-25, 2017, 10 pages.
Chattopadhyay, Arnab, "IoT Security Using Blockchain", Labs Blog (http://sogeti.com/category/labs-blog, May 31, 2017, 8 pages.
Heber et al., "Towards a Digital Twin: How the Blockchain Can Foster E/E-traceability in Consideration of Model-Based Systems Engineering," International Conference on Engineering Design, Aug. 21-25, 2017, 10 pages.
Higashikado et al., "A Study on Certificate Management in Consortium Chain", A Study on certificate management in consortium chain, proceedings of 2017 Symposium on Cryptography and Information Security, Japan, Jan. 24, 2014, 8 pages.

\* cited by examiner (a)          (b)          (c)

COMPUTER-IMPLEMENTED SYSTEMS AND METHODS FOR LINKING A BLOCKCHAIN TO A SET OF DIGITAL TWINS

FIELD OF THE INVENTION

This specification relates generally to computer-implemented methods and systems suitable for implementation with a blockchain network. The invention is particularly suited, but not limited, to use with the Bitcoin blockchain. The invention also relates to security, integrity and efficiency in computer implemented systems.

BACKGROUND OF INVENTION

Industrial assets are designed relying on various models and a high number of data sources. Data scientists work with enormous amounts of data while specialized teams create models separately and conduct analysis for their specific tasks. The most current information and calculations may not be readily available for crucial decisions and this way of working in silos drives cost and inefficiencies, creates uncertainties, and a vast amount of time and resources get wasted.

A digital twin is a virtual dynamic copy of a real object, process, or service through which it is possible to conduct tests and prevent errors or failures. It is possible to create a digital twin of a product, a mechanical part of an aircraft or car, a production process, and so on. Digital twins can be seen as a revolutionary combination of simulations, real time data, and responses.

The act of simulating a process or a system presumes knowledge of how all the variables involved in the simulation behaved in the past and a sufficiently large timeframe during which the system under test has been observed and all the input/output variables have been recorded. Having knowledge of the past is a prerequisite for building a good simulator. The possibility of adding real time information to this process can dramatically increase the precision and the accuracy of the whole simulation until the point of mirroring the exact behaviour of a system or process.

FIG. 1 shows a simple schematic illustration of a digital twin for a physical system. Sensors gather data about a physical system which could be, for example, a part of an aircraft. Historical data is used to construct the digital twin which then evolves to simulate the physical system as further real time data is fed into the system. The digital twin can be used to monitor parameters of the physical system, assess the current status of the physical system, predict the future status of the physical system, conduct tests and predict failures as previously mentioned.

SUMMARY OF INVENTION

A number of problems have been identified with current digital twin technology as discussed below.

The reliability and security of a digital twin is dependent upon the security of the data on which the digital twin is reliant. The data should ideally be immutable, such that the operation of the digital twin cannot be tampered with during real time operation, and such that the digital twin correctly reflects the status of the physical system. This can be important, for example, to prevent a third party from interfering with the data such that the digital twin does not properly represent the real time status of the physical system. This can result in the digital twin providing misleading information which could lead to an operation error or failure in the physical system.

Furthermore, the stored data should be immutable such that an accurate and reliable historical record of the performance of the system is retained. This may be important, for example, if the physical system fails and the data needs to be checked to confirm why the physical system failed and if any liability exists on the part of the user or manufacture of the physical system. It may also be important in a process where a certain action may be reliant on the performance of an earlier action. In this case, a third party could potentially alter the stored data to make it look like a certain action has been performed, when it has not, thereby erroneously triggering a further action.

A further problem is that of accessibility of the data to each of a number of interested parties. The parties may well have conflicting interests and so it would be advantageous to have an accurate and impartial record of the data, which is secure and immutable yet accessible by all parties.

Yet a further problem is that conventional data storage solutions, such as a black box recorder in an aircraft, may be damaged or lost in the event of an accident.

Yet another problem is that in a scenario where a further action is required once a previous action has been completed, a digital twin can indicate that the further action is required but cannot ensure that it is actually performed. For example, a digital twin may indicate that a certain physical process has been completed, thus requiring a further step such as payment for completion of the physical process. However, the digital twin cannot ensure that such a payment is actually made and thus is reliant on a party to the process to be trustworthy and pay, or otherwise pay in advance which is then depend on the trustworthiness of the provider of the process to properly complete the process.

It is an aim of certain embodiments of the present invention to address these problems by providing solutions as set out herein.

The aforementioned problems can be addressed by using blockchain technology as a storage system for data acquired from physical systems and processes including real time applications using digital twins. The data generated from the digital twin can be, for example, data associated with one or more parameters of a physical system generated by one or more sensors monitoring the one or more parameters of the physical system. A blockchain can be used to generate an immutable transaction history of data produced by a digital twin. In the case of an error, failure, incident, or accident, parties of interest can then access and analyse an immutable set of data. This can be particularly important in safety-critical systems such as aircraft. Furthermore, as a blockchain provides a distributed storage of data, then it is not susceptible to damage or loss of an individual storage unit. Further still, data from a digital twin can be utilized in the implementation of a digital smart contract on a blockchain network. This can ensure that steps can be executed by the blockchain network according to data received by the digital twin indicative of the state of a real physical system. That is, the blockchain network can be used to execute a digital smart contract with multiple parties related to a system or process incorporating the digital twin.

Current blockchain technology is capable of fulfilling the aforementioned functionality when relatively small amounts of data are required to be stored at relative infrequent time periods. However, block size limits, and the fact that blocks are only incorporated into the blockchain approximately every 10 minutes, means that standard blockchain technology is not well suited as a storage system for real time applications where the amount of data generated is very large and/or where there is a requirement to store the data at a high frequency/fidelity, e.g. every second or millisecond. Approaches to overcoming these issues in order to utilize the blockchain as a storage system for such real time systems are described herein.

Embodiments of the present invention can be provided in a variety of forms. For example, a computer readable storage medium can be provided which comprises computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. The computer implemented methods as described herein can also be implemented in one or more of a digital twin, a buffer, a blockchain network node, or a system comprising a combination of said components. The components could be located remotely from each other or one or more of the components may be integrated.

As described in the detailed description, a computer-implemented method for a blockchain network is provided, the computer-implemented method comprising:
  receiving data from a set of digital twins;
  storing said data in an accessible distributed storage system;
  calculating a digest of a data structure representing a compressed version of the data received from the set of digital twins; and
  transmitting the digest for storage on a blockchain.

In the detailed description an embodiment is described in which the distributed storage system comprises a distributed hash table and the digest of the data structure is a root of a Merkle tree derived from the data received from the set of digital twins. However, the methodology can also be implemented using different cryptographic functions having an associated digest of a data structure representing a compressed version of the data received from the set of digital twins.

The data structure (e.g. Merkle tree) can be configured to identify in which node of the accessible distributed storage system (e.g. distributed hash table) the data has been stored. Furthermore, the data structure can be stored in the accessible distributed storage system. Further still, the digest of the data structure (e.g. the root of the Markle tree) can be transmitted to a buffer prior to forwarding for storage on the blockchain, the buffer selecting a sampling frequency of information represented by the digest of the data structure. The buffer can generate messages containing the digest information and transmit the messages through a secure channel for storage on the blockchain. A receiver can receive the messages from the buffer and access the distributed storage system to verify the messages. After verification, the receiver can then transmit the digest of the data structure for storage on the blockchain.

According to certain configurations, a second data structure can be provided having a second digest derived from the data received from the set of digital twins (e.g. a second Merkel tree having a second root derived from the data received from the set of digital twins). The digests from each data structure can be stored in the accessible distributed storage system.

Furthermore, the digests from each data structure can be stored in the buffer. The buffer can then access the distributed storage system using both digests to confirm whether the digests are the same, and if so, the buffer transmits one of the digests for storage on a blockchain. Otherwise, if the digests are found to be different, then the digests can be verified to detect which digital twin is not responding.

A computer readable storage medium is also provided comprising computer-executable instructions which, when executed, configure one or more processors to perform the method as described herein.

An electronic device is also provided comprising:
  an interface device;
  one or more processor(s) coupled to the interface device;
  a memory coupled to the one or more processor(s), the memory having stored thereon computer executable instructions which, when executed, configure the one or more processor(s) to perform the method as described herein.

Further still, a system is provided configured to perform the method as described herein, the system comprising:
  a set of digital twins;
  an accessible distributed storage system for storing data from the set of digital twins;
  a processor for calculating a digest of a data structure representing a compressed version of the data received from the set of digital twins; and
  a transmitter for transmitting the digest for storage on a blockchain.

The present invention differs from prior art relating to digital twins in that it is specifically directed to a blockchain methodology for managing data streams from a set of digital twins rather than a single digital twin. The inventive concept involves receiving data from the set of digital twins, storing said data in an accessible distributed storage system, calculating a digest of a data structure representing a compressed version of the data received from the set of digital twins, and transmitting the digest for storage on a blockchain.

In the described embodiment the distributed storage system comprises a distributed hash table and the digest of the data structure is in route of a Merkle tree derived from the data received from the set of digital twins. That is, a common Merkle tree structure is used for the set of digital twins rather than a separate Merkle tree for each digital twin. The present invention provides a solution to the problem of handling a large amount of data from digital twins while also enabling the date to be securely verified. In the present case, the solution enables a large amount of data to be managed from a set of digital twins while compressing the amount of data which is required to be stored on the blockchain and also still enabling verification of the data. This contrasts with prior art such as that briefly discussed below.

US2017/0284974 discloses digital twin systems. However, there does not appear to be any disclosure of storing data from such digital twin systems on a blockchain, and certainly no disclosure of the specific methodology as described in the present specification.

CN105812126 would appear to disclose the acquisition of human physiological data and storage of this data on a blockchain. However, there does not appear to be any disclosure of the methodology as described in the present specification for processing data from a set of digital twins.

A Carlo Gutierrez article entitled "Boeing Improves Operations with Blockchain and the Internet of Things" would appear to disclose utilising digital twins and storing data on a blockchain. However, the document only provides a relatively high level overview and there does not appear to be any detail as to how this is achieved in practice. Again, there is no disclosure of the methodology as described in the present specification for processing data from a set of digital twins.

An article by Burkhard Blechschmidt entitled "Digital Twin on Blockchain, Enabling the Circular Economy" is another high level document relating to applications involving digital twins and blockchains. Again there is no detail about how this is achieved in practice and certainly no disclosure of the particular methodology as described in the present specification for handling data from a set of digital twins.

An article by Trouton et al. entitled "3D Opportunity for Blockchain" also appears to disclose the use of blockchain technology in combination with digital twins in order to manage system data. Again, there does not appear to be any detail about how the system is configured to process and save the data. In particular, there does not appear to be any disclosure of the methodology as described in the present specification for dealing with data streams from a set of digital twins.

An article by Stocker entitled "Implementing First Industry 4.0 Use Cases with DAG Tangle-Machine Tagging for Digital Twins" also appears to disclose the use of blockchain technology in combination with digital twins in order to manage data. Again, there does not appear to be any detail about how the system is configured to process and save the data. In particular, there does not appear to be any disclosure of the methodology as described in the present specification for processing data from a set of digital twins.

BRIEF DESCRIPTION OF THE DRAWINGS

Aspects of the present invention will be apparent from and elucidated with reference to, the embodiments described herein. Embodiments of the present invention will now be described, by way of example only, and with reference to the accompany drawings, in which.

DETAILED DESCRIPTION

Figure 1:
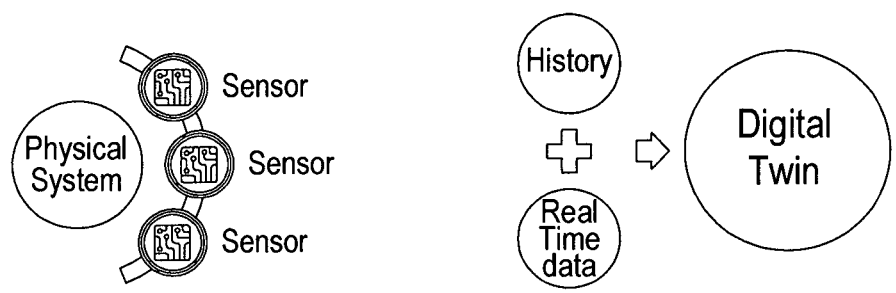
FIG. 1 shows a simple schematic illustration of a digital twin for a physical system.

In this document we use the term 'blockchain' to include all forms of electronic, computer-based, distributed ledgers. These include, but are not limited to, consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block. The blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible. At the time of writing, the Bitcoin blockchain network is based on a blocksize which contains approximately 2000 transactions and a block is mined approximately every 10 minutes.

Although blockchain technology is most widely known for the use of cryptocurrency implementations, digital entrepreneurs have begun exploring the use of both the cryptographic security system Bitcoin is based on and the data that can be stored on the blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof record of events, distributed processing etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

The present specification describes the use of the blockchain in combination with a digital twin and optionally also in combination with the use of smart contracts. As previously described, a digital twin can simplify supply management processes and can be an important diagnosis tool for safety critical systems (e.g. aircraft and aerospace industry or transportation in general). The potential applications for a combination of digital twin and blockchain technology are numerous. For example, a blockchain network can be used for safely storing information generated by a digital twin or for executing a contract with multiple parties involved related to a system or process incorporating a digital twin. A digital twin can effectively function as an interface between a physical system and the blockchain such that data about a system or process can be acquired by the digital twin and stored on the blockchain and the blockchain can trigger certain actions based on the received data according to one or more smart contracts stored on the blockchain.

The amount of real time data generated by a digital twin can vary depending upon the complexity of the system being mirrored. For example, a digital twin can be constructed that mirrors the temperature of an office. In this case, considering that the temperature of a room does not usually have sudden variations, it can be reasonable to transmit a value of temperature every minute (or every 5 minutes), in order to reduce the amount of data to be transmitted over a network. In the case of a value of temperature every minute, the digital twin will record and transmit (in real time), 60 values of temperature every hour.

Such an amount of data is certainly reasonable for storage on a blockchain, and it does not create any major issues. However, the situation becomes more complicated if the system being mirrored is, for example, an engine of an aircraft during a flight, or a cylinder of a train during a train journey. In these examples, even transmitting values every second may not be sufficient, and it could be necessary to guarantee higher fidelity, e.g., a sample every millisecond (very possible in the case of an aircraft). Also, the number of variables recorded can vary and in complex systems there may be a requirement to record a large number of variable at high fidelity.

The need to consider the amount and frequency of data transmitted by a digital twin is an important premise that entails constraints when considering the blockchain as a possible backbone infrastructure for storing information related to a specific object or process. The amount of data generated by a digital twin is very high, and therefore managing such a large amount of data can be extremely difficult when trying to interface the structure of digital twins with a Blockchain. In this specification an improved protocol is described based on Merkle trees and including the following characteristics:
1. We propose a solution that enables the storage of a very large amount of information generated by a set of digital twins in a DHT (Distributed Hash Table) and the storage of the correspondent value of the root of a Merkle tree on a public Blockchain.
2. We propose the use of a Merkle tree structure as a proof of existence of data generated by a set of digital twins, and as a way for identifying in which node of the DHT the actual data has been stored.
3. We propose the concept of mirrored Merkle trees to introduce an additional layer of security and reliability for the data transmitted from the buffer to the receiver.

Merkle Trees

A hash function is a one-way function that takes an input and generates a fixed length output. A well-designed hash function is based on the property that two inputs will not generate the same output (collision) with high probability. Therefore, a hash can be considered as a unique identifier for a given piece of content.

For instance, a file F can be stored in a peer-to-peer network by dividing it into small chunks, and distributing them across the network. The peers involved in this process are required to provide sufficient bandwidth and disk space. Moreover, the peers are anonymous and untrusted, so it would be risky to accept F from a peer without first verifying that the content is legitimate.

Figure 2:
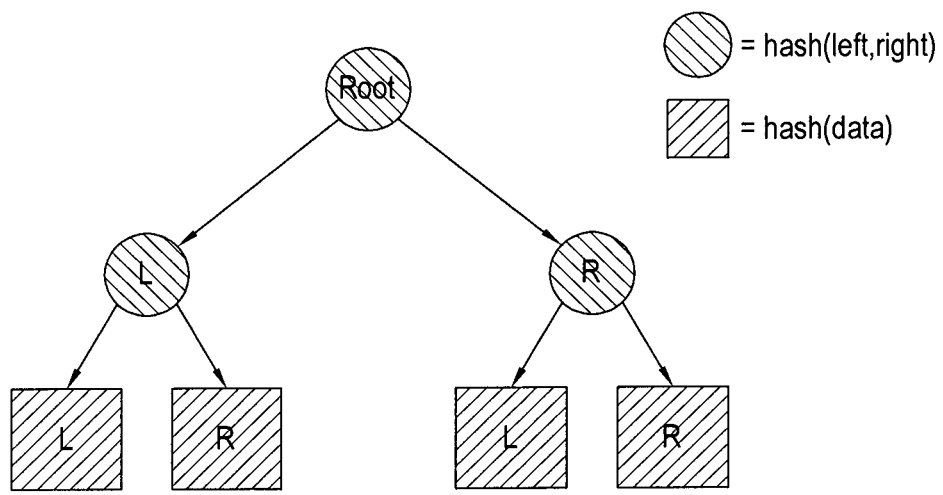
FIG. 2 shows an example of a Merkle Tree.

Merkel trees have unique properties that allow us to efficiently verify data across the network of peers. A Merkle tree is a binary tree whose nodes store hashes instead of piece of data, as shown in FIG. 2. The leaf nodes store hashes of portions of data, while the parent nodes store the hash of the concatenation of the left and right children.

Figure 3:
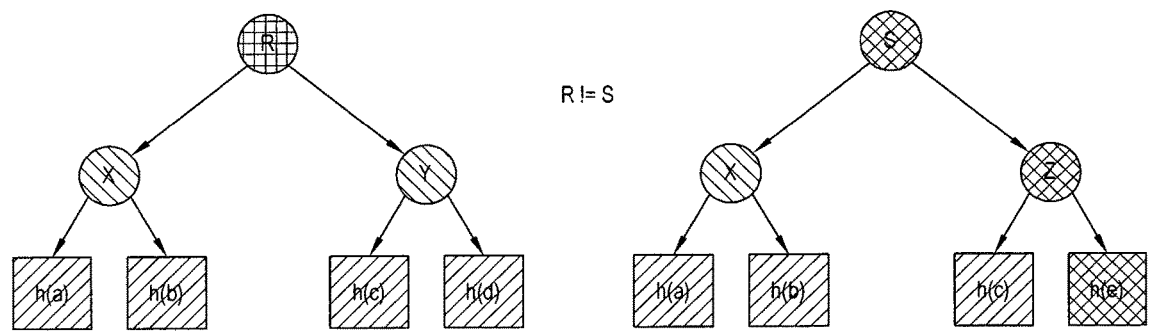
FIG. 3 shows two different Merkle trees.

A fundamental property is that the only elements we need to check to compare two Merkle trees are the roots, as shown in FIG. 3. The two Merkle trees are different because the two roots R and S are different. Therefore, the two trees represent two different sets of data, e.g. {a, b, c, d} on the left and {a, b, c, e} on the right.

Incremental Hashing of History

The information stored in the blockchain is not the data generated by the digital twin, but only the signed hash of a given amount of data D, generated in a given frame of time T. The incremental hashing of history is based on the following steps:
1. The digital twin starts recording data at a given frequency f;
2. data is recorded in a private node;
3. at time $T_0$, the node generates the first hash ($H_0$) hashing the data recorded by the digital twin: $H_0=H(D)$ at time $T_0$ and records the hash both locally and on the blockchain;
4. at time $T_0+x$, every new hash will be linked with the previous one (the second hash will be linked with $H_0$, and so on), generating a chain of hashes that will be recorded on the blockchain.

The blockchain will contain a sequence of hashes, which can be used to rebuild the whole data history generated by the digital twin, and to verify the authenticity of the recorded information by the private node.

Moreover, if the digital twin is sending critical information, e.g. it is mirroring a mechanical part of a device involved in a safety-critical operation, then the information should be sent over the network through a secure channel.

Blockchain Used as Proof of Existence

The properties of Merkle trees can be exploited in order to make the process of storing and verifying data collected from digital twins—connected to complex systems (e.g. an aircraft)—more efficient. Indeed, instead of storing as many hashes as the number of digital twins, it is possible to store only the root of a Merkle tree which represents the system under observation (SUO), as shown in FIGS. 4(*a*) to 4(*c*).

Figure 4:
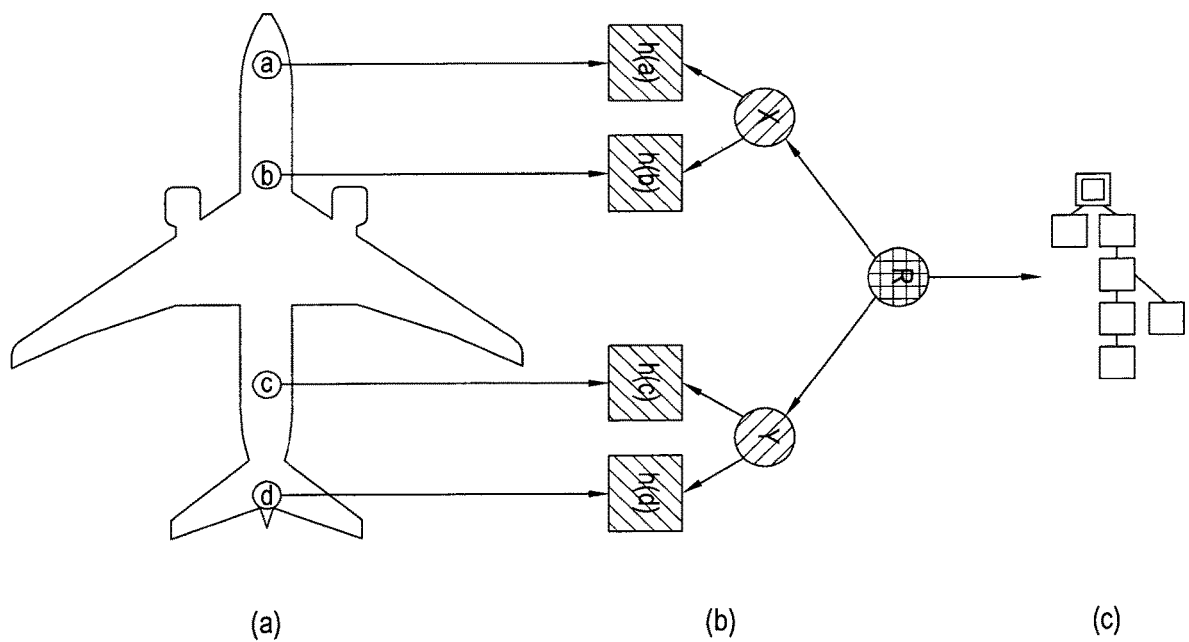
FIGS. 4(a) to 4(c) show a system comprising four digital twins, a Merkle tree having a root derived from data from the four digital twins, and a blockchain on which the root is stored.

FIG. 4(*a*) shows the system under observation monitored by four digital twins {a, b, c, d} mimicking specific parts of the aircraft. The digital twins generate data at a given rate.

The data are stored in a private node (or multiple nodes) and their hashes are used to compute the root (FIG. 4(b)). The only information that is stored on the blockchain is the root of the Merkle tree (FIG. 4(c)). This means that the amount of information generated by the array of digital twins does not have an impact on the storage requirements on the blockchain. Note also that the frequency used to generate each timestamp (root of the Merkle tree) depends on the application.

Figure 5:
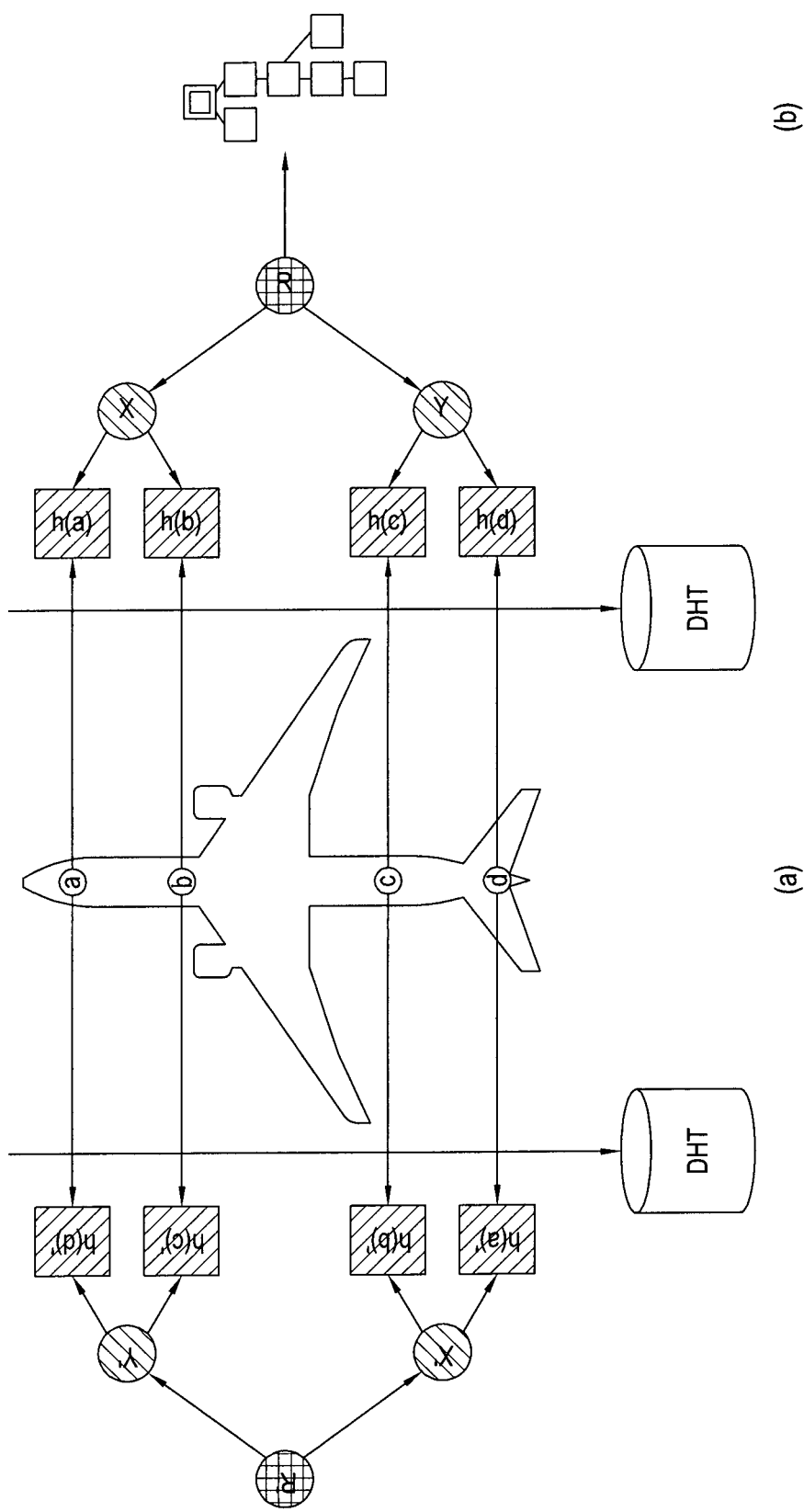
FIGS. 5(a) and 5(b) illustrate the use of a blockchain as proof of existence for data generated by digital twins, the system being similar to that shown in FIGS. 4(a) to 4(c) but modified such that data from the digital twins is stored in a distributed hash table and where a second, duplicate Merkle Tree is provided which provides degeneracy in the event of a malfunctioning of the connection between the digital twins and the blockchain network.

In this way, we can use Merkle trees and digital twins to build an on-chain proof of existence for the data generated. FIGS. 5(a) and 5(b) illustrate the use of a blockchain as proof of existence for data generated by digital twins. The information stored on the blockchain (FIG. 5(b)) would be used to prove the existence, at a certain time, of a set of data generated by the array of digital twin and stored in distributed hash tables (DHTs), as shown in FIG. 5(a). The recorded hashes could be also used to identify which nodes of the DHT contain a certain information.

In the next section, we present an improved protocol to store data generated by digital twins using (single or combinations of) Merkle trees.

Merkle Tree-Based Protocol for Incremental Hashing of History

We propose an optimized solution based on Merkle trees and incremental hashing of history to use the blockchain as a certified system for the storage of information generated by an array of digital twins.

Figure 6:
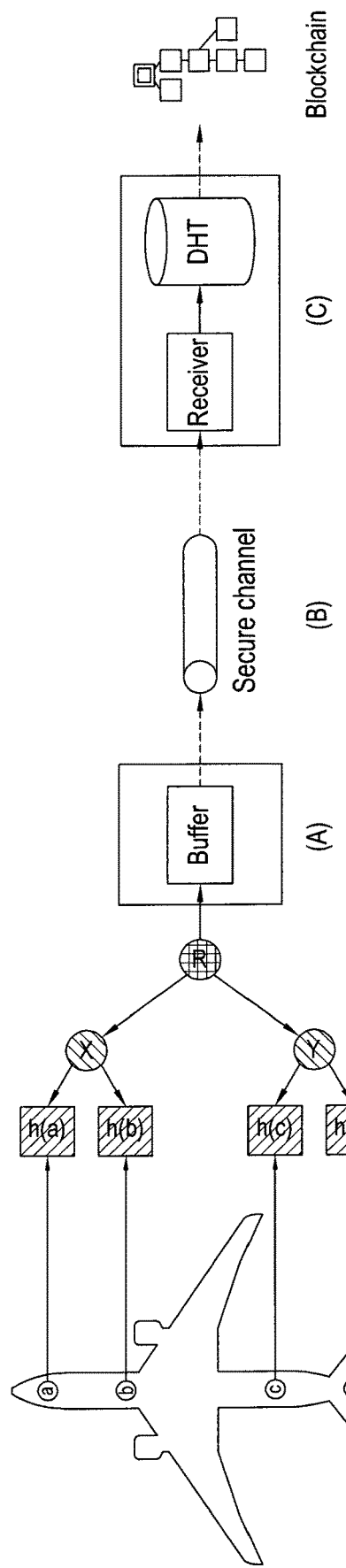
FIG. 6 illustrates the parties involved in a Merkle Tree-based protocol for incremental hashing of history.

FIG. 6 shows the scheme of the parties involved in one solution. In order to implement a secure channel, we need to create a shared key K between the sender (the Buffer in our case (A) in FIG. 6) and the Receiver, and the prerequisite is that the key K is only known to the sender and the receiver. The role of the Buffer is to work as an interface connecting the Merkle tree, which represents a set of digital twins, to the secure channel. During this process, the stream of data S—composed of the raw data generated by the digital twins and the hash of the Merkle tree—is transformed into a sequence of discrete messages $\{m_1, m_2, \ldots, m_n\}$. The buffer will take care of collecting, storing and transmitting all the data generated. After the discretization of S and the generation of the n required messages, a new value for the key $K_i$ will be generated for each message $m_i$. A key negotiation protocol is used between the Buffer and the Receiver to arrange a unique key (session key) every time the secure channel is established, for instance every time a message $m_i$ is sent. The Buffer will decide how many discrete messages will be sent, for example according to the condition of the network at the time of the transmission.

For each message $m_i$ sent over the channel, the Buffer will calculate and store the hash $H(m_i)$. It will then compose the message $m_h = H(m_1), H(m_2), \ldots, H(m_n)$ and append $m_H = H(m_h)$ to finalise the procedure. The Receiver receives a sequence of messages, which can be verified using $m_h$ and $m_H$.

The Protocol

The solution described in the previous section works if the set of digital twins mirroring the SUO is limited or related to a process/system which does not generate a high volume of data. When the SUO is characterized by a large number of digital twins, or the set of digital twins are mirroring a complex system described by many variables requiring a larger amount of data, the transmission of both the message (containing the raw data) and the root of the associated Merkle tree at a given time, may not be efficient. In this section, we present a protocol characterized by (i) storage of raw data directly on a DHT and (ii) computation, transmission and storage of the root of the associated Merkle tree on the blockchain.

Figure 7:
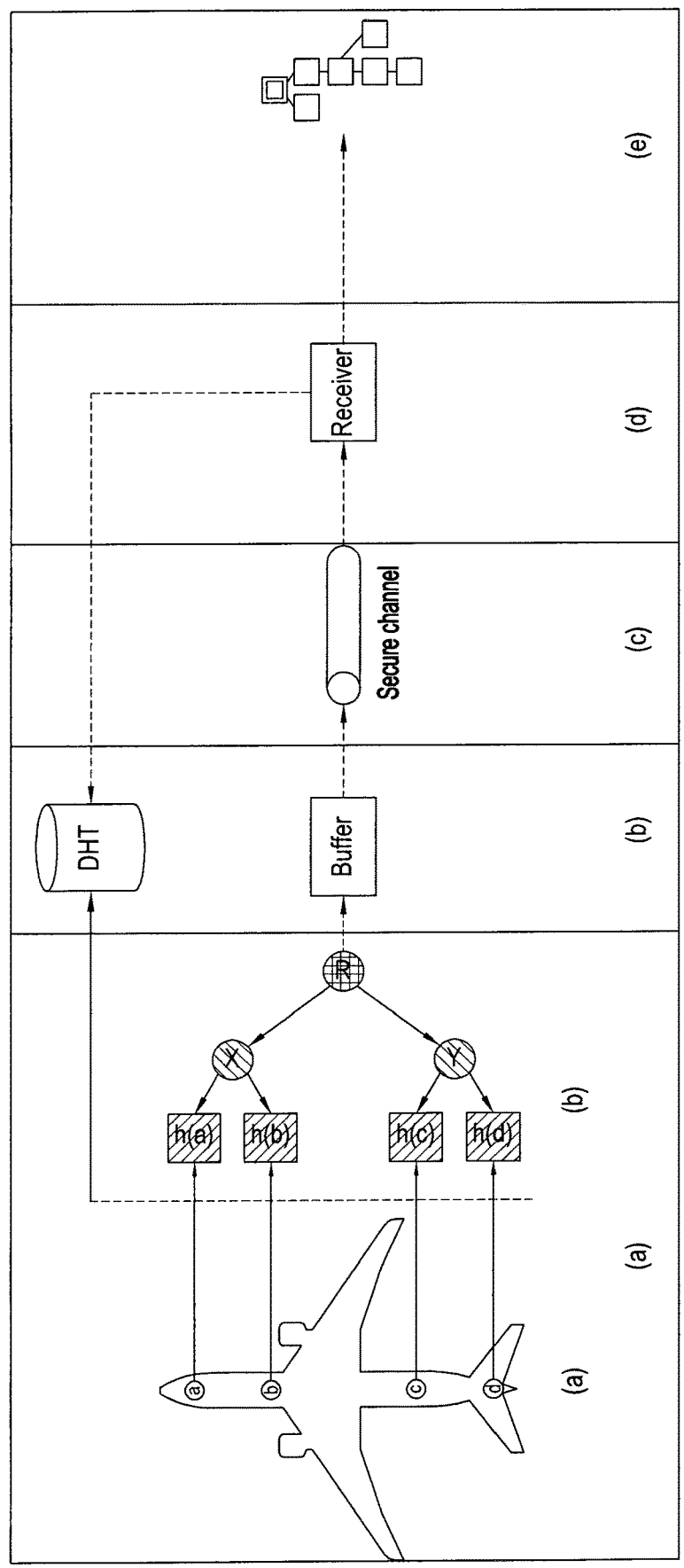
FIG. 7 illustrates the phases involved in a Merkle Tree-based protocol for incremental hashing of history.

The proposed protocol is based on the following steps as shown in FIG. 7:

1. The data (continuously) provided by the set of digital twins mirroring a system (a) are stored in a DHT (b).
2. The Merkle tree (a) is used to link together all the digital twins mirroring the system. Only the root of the tree will be transmitted and stored on the Blockchain.
3. During step (b), the buffer is responsible for selecting the sampling frequency of the information represented by the root of the Merkle tree. The frequency will depend on the system under control and the desired resolution.
4. The messages generated by the buffer in step (b), are sent over a secure channel (c) and then received by the receiver in step (d).
5. The receiver has access to the DHT, where the data generated by the set of digital twins are stored. The DHT can be used to verify the integrity of the information. The DHT used is a private platform. Therefore, a non-authorized user cannot have access to the information stored within the DHT.
6. As a final step, the hash of the Merkle tree's root is stored on the Blockchain.

The receiver (b) acts as an interface between the SUO and the Blockchain. Since the number of Merkle tree's roots received can be very high, and considering the network latencies, it is necessary to temporary store the information received until the publication on the Blockchain. Additionally, the receiver is also able to verify if a given root is correct and represented by a given Merkle tree:

by checking the message $m_h$ and $m_H$; and
by accessing the relevant DHT.

Figure 8:
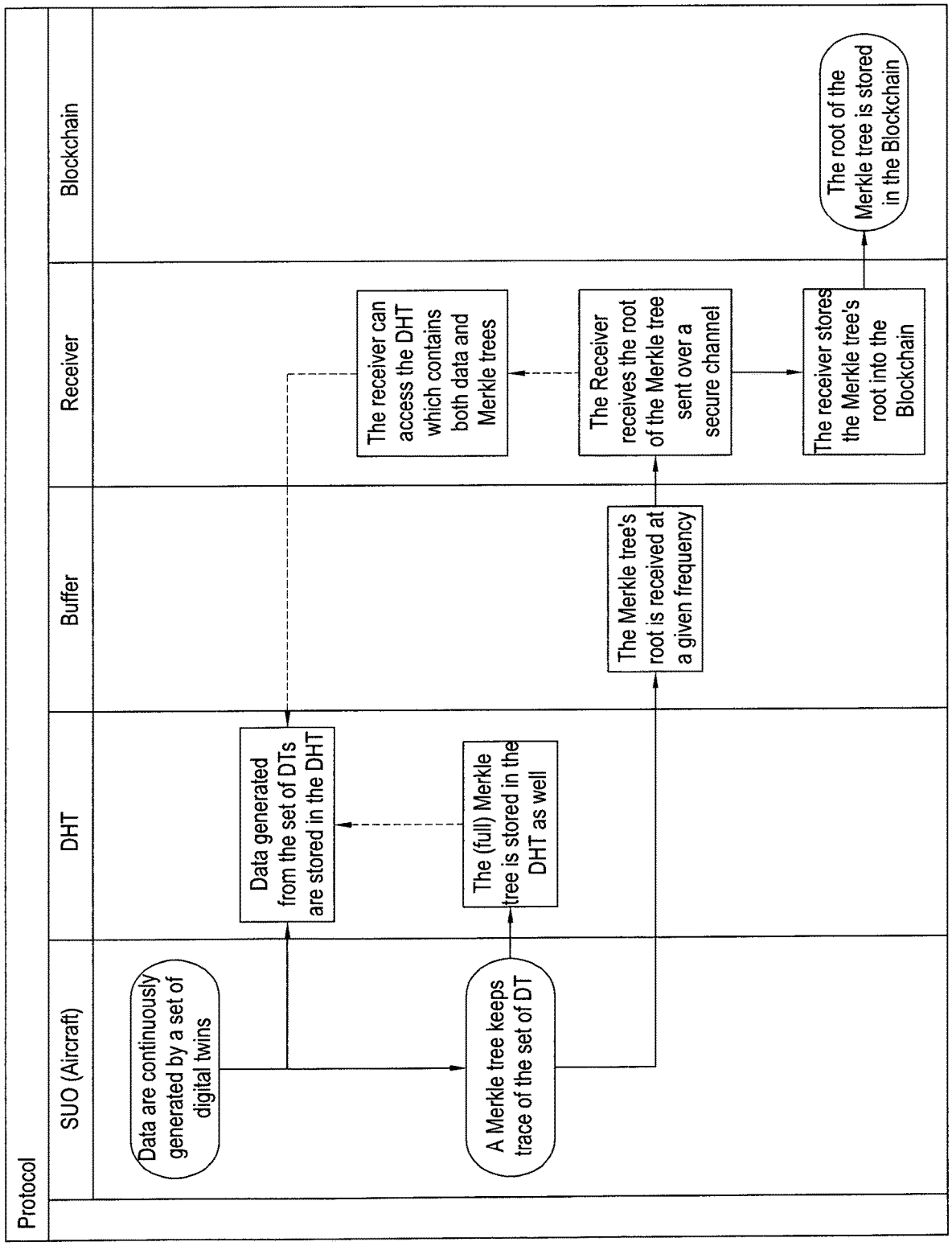
FIG. 8 illustrates the steps involved in a Merkle Tree-based protocol for incremental hashing of history.

FIG. 8 illustrates the steps involved in a Merkle Tree-based protocol for incremental hashing of history.

While the aforementioned approach enables management of a large amount of data form a set of digital twins, one potential problem may be inconsistent data resulting because of malfunctioning of the connection between the digital twins and the network. In the next section, we illustrate a modified solution to increase the reliability and security of the protocol.

Mirrored Merkle Trees

Figure 9:
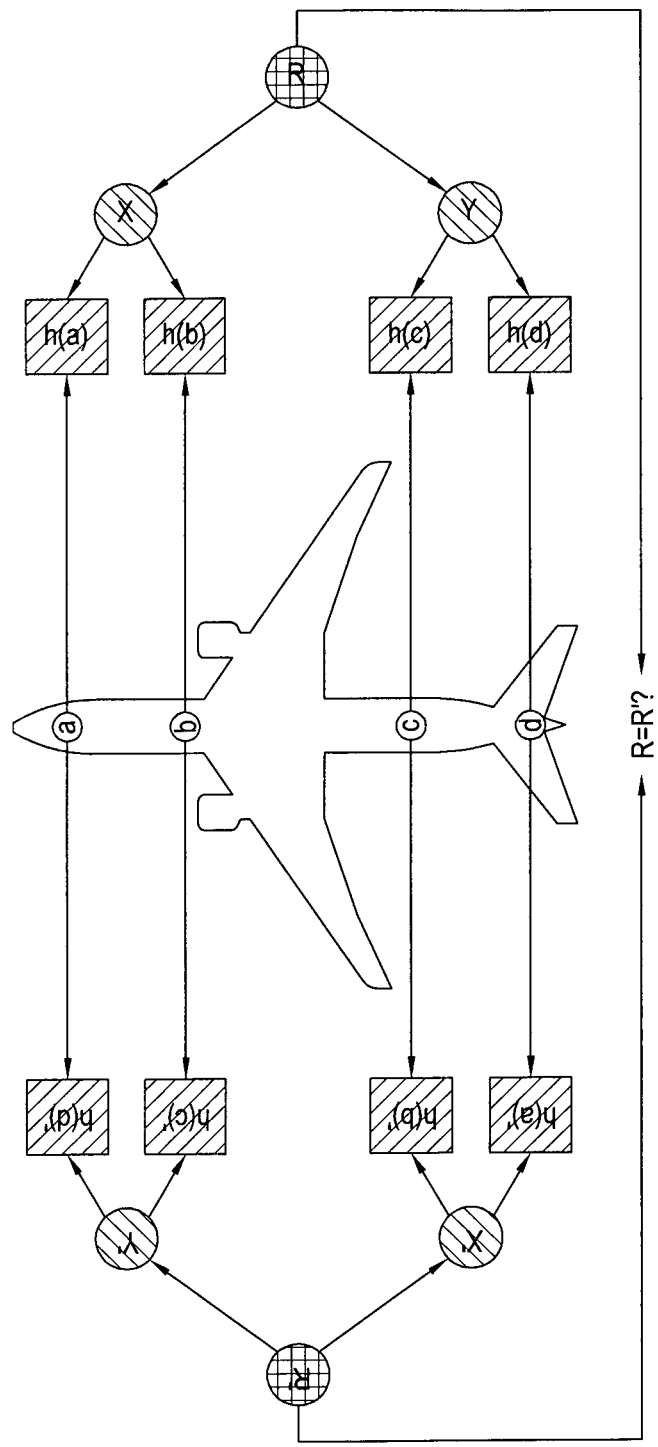
FIG. 9 illustrates mirrored or duplicate Merkle trees as previously shown in FIGS. 5(a) and 5(b) which provides degeneracy in the event of a malfunctioning of the connection between the digital twins and the blockchain network.

In order to increase the reliability of the step B in the transmission protocol, i.e. to assess if the root of the Merkle tree is correctly stored in the buffer, we propose a duplicated structure as shown in FIG. 9.

The two hashes R and R' of the roots of the Merkle trees are stored in the DHT and in the buffer, and can be used to verify whether the array of digital twins is providing consistent data. A cache system is added to the buffer in order to check the consistency of the Merkle tree's roots.

The buffer contains three sets of roots: the cache set, the confirmed set and the unconfirmed set. The following steps describe the additional part of the protocol:

The cache set contains the pair of roots generated by the mirrored trees, R and R'.
The buffer can access the DHT using the root R and R'.
If the access to the DHT with R and R' is successful, then the two roots are the same, i.e. the root R is transferred in the confirmed set.
If the access to the DHT with R and R' is discordant, then the root R is transferred to the unconfirmed set.

Figure 10:
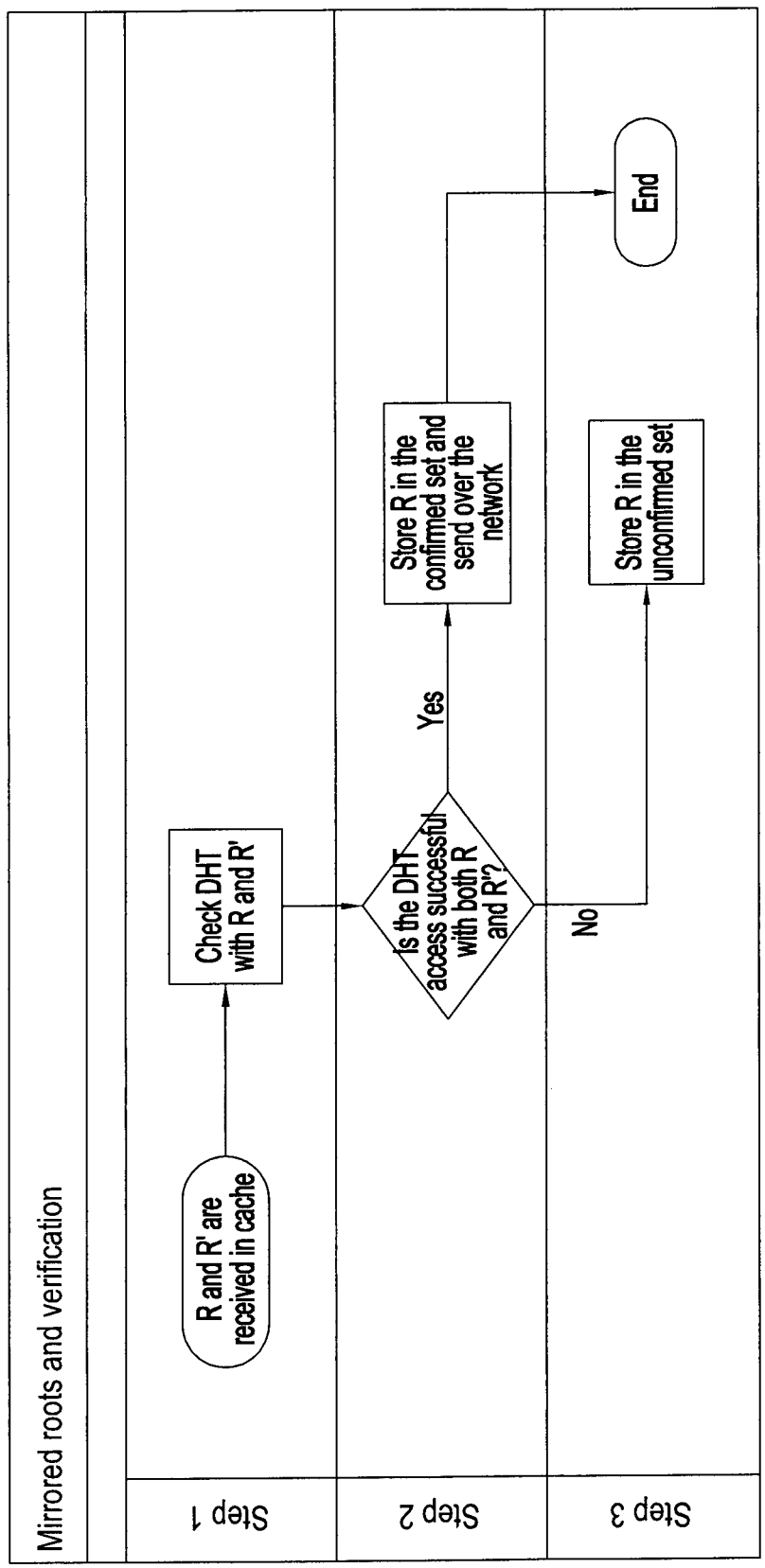
FIG. 10 shows the steps for mirrored roots and verification in order to check reliability of transmission and maintain consistent data.

The roots in the confirmed set are transferred over the network, while the roots in the unconfirmed set are verified in order to detect which digital twin(s) is not responding properly. FIG. 10 shows the steps for mirrored roots and verification.

Computing Environment

Figure 11:
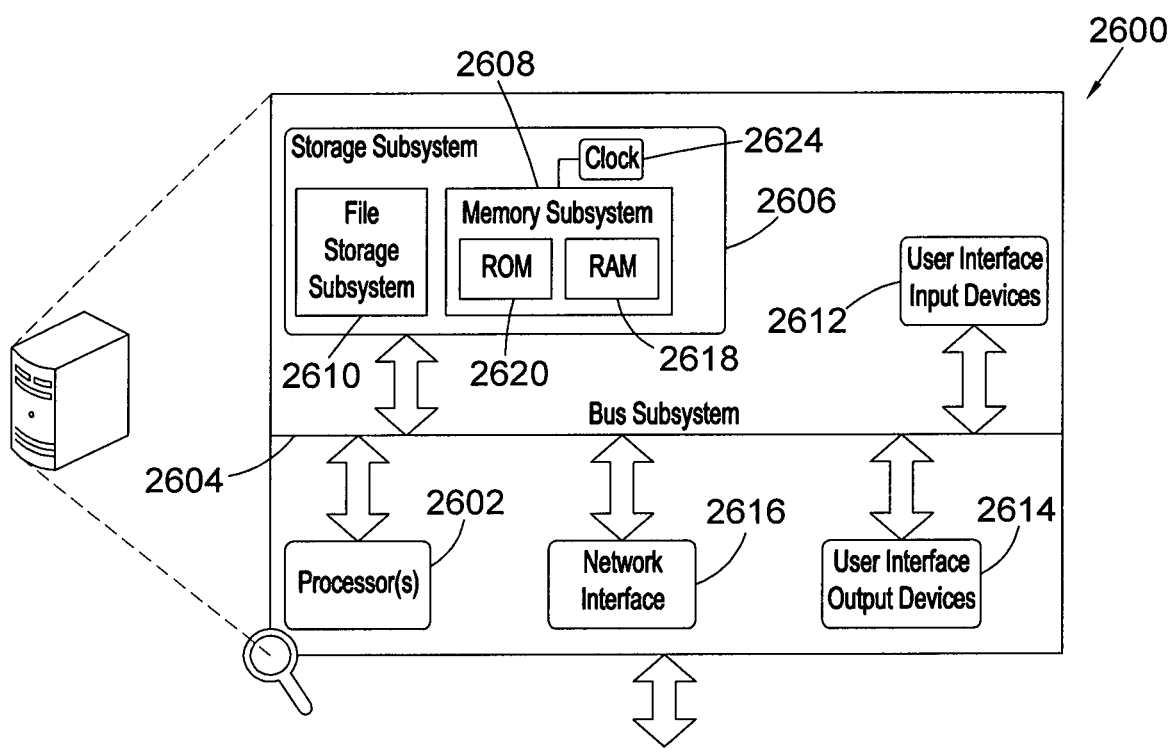
FIG. 11 is a schematic diagram illustrates a computing environment in which various embodiments can be implemented.

FIG. 11 is a schematic diagram illustrates a computing environment in which various embodiments can be implemented. There is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 11, the computing device 2600 may include one or more processors with one or more levels of cache memory and a memory controller (collectively labeled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 11 is intended only as a specific example for purposes of illustrating the preferred embodiment of the device. Many other configurations having more or fewer components than the system depicted in FIG. 11 are possible.

Summary

In this specification we have presented a solution based on the use of Merkle trees for storing data generated by arrays of digital twins.

The main issue of using a public blockchain for storing information generated by digital twins is the fact that the amount of data generated by digital twins is very high, and it would not be possible to store such massive datasets into a public distributed ledger given the technological limits imposed by their structure.

In this specification:
1. We have described a solution which enables the storage of a very large amount of information generated by a set of digital twins in a DHT (Distributed Hash Table) and the storage of the correspondent value of the root of a Merkle tree on a public blockchain.
2. We have described the use of a Merkle tree structure as a proof of existence of data generated by a set of digital twins, and as a way for identifying in which node of the DHT the actual data has been stored;
3. We have described the concept of mirrored Merkle trees to introduce an additional layer of security and reliability for the data transmitted from the buffer to the receiver.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for a blockchain network, the computer-implemented method comprising:
receiving data from a set of at least one pair of digital twins;
storing said data in an accessible distributed storage system;
calculating a digest of a data structure representing a compressed version of the data received from the set of at least one pair of digital twins; and
transmitting the digest for storage on a blockchain in the blockchain network, wherein the digest of the data structure is transmitted to a buffer prior to forwarding for storage on the blockchain, the buffer selecting a sampling frequency of digest information represented by the digest of the data structure,
wherein the buffer generates messages containing the digest information and transmits the messages through a secure channel for storage on the blockchain,
wherein a receiver receives the messages from the buffer and accesses the accessible distributed storage system to verify the messages, and
wherein the buffer and the receiver use a key negotiation protocol to create a shared key between the buffer and the receiver to implement the secure channel, each time the buffer transmits a message through the secure channel for storage on the blockchain.

2. The computer-implemented method according to claim 1, wherein the data structure is configured to identify in which node of the accessible distributed storage system the data has been stored.

3. The computer-implemented method according to claim 1, wherein the data structure is stored in the accessible distributed storage system.

4. The computer-implemented method according to claim 1, wherein the accessible distributed storage system is a distributed hash table and distributed hash table is a private platform such that non-authorised users cannot have access to the information stored within the distributed hash table.

5. The computer-implemented method according to claim 4, wherein the receiver is authorized to have access to the distributed hash table.

6. The computer-implemented method according to claim 1, wherein, after the receiver verifies the messages, the receiver transmits the digest of the data structure for storage on the blockchain.

7. The computer-implemented method according to claim 1, further comprising a second data structure having a second digest derived from the data received from the set of digital twins.

8. The computer-implemented method according to claim 7, wherein digests from each data structure are stored in the accessible distributed storage system.

9. The computer-implemented method according to claim 1, wherein the accessible distributed storage system comprises a distributed hash table and the digest of the data structure is a root of a Merkle tree derived from the data received from the set of digital twins.

10. A non-transitory computer readable storage medium comprising computer-executable instructions which, when executed, configure one or more processors to perform the method of claim 1.

11. A non-transitory computer readable storage medium comprising computer-executable instructions which, when executed, configure one or more processors to perform the method of claim 2.

12. A non-transitory computer readable storage medium comprising computer-executable instructions which, when executed, configure one or more processors to perform the method of claim 3.

13. An electronic device comprising:
an interface device;
one or more processor(s) coupled to the interface device; and
a memory coupled to the one or more processor(s), the memory having stored thereon computer executable instructions which, when executed, configure the one or more processor(s) to perform the method of claim 1.

14. An electronic device comprising:
an interface device;
one or more processor(s) coupled to the interface device; and
a memory coupled to the one or more processor(s), the memory having stored thereon computer executable instructions which, when executed, configure the one or more processor(s) to perform the method of claim 2.

15. A system comprising:
a set of at least one pair of digital twins that transmits data;
an accessible distributed storage system for storing data from the set of at least one pair of digital twins;
a processor for calculating a digest of a data structure representing a compressed version of the data received from the set of digital twins; and
a transmitter for transmitting the digest for storage on a blockchain in the blockchain network, wherein the digest of the data structure is transmitted to a buffer prior to forwarding for storage on the blockchain, the buffer selecting a sampling frequency of digest information represented by the digest of the data structure,
wherein the buffer generates messages containing the digest information and transmits the messages through a secure channel for storage on the blockchain, wherein a receiver receives the messages from the buffer and accesses the accessible distributed storage system to verify the messages, and wherein, the buffer and the receiver use a key negotiation protocol to create a shared key between the buffer and the receiver to implement the secure channel, each time the buffer transmits a message through the secure channel for storage on the blockchain.

16. A system comprising:

a set of at least one pair of digital twins that transmits data;

a private and accessible distributed hash table for storing data from the set of at least one pair of digital twins;

a processor for calculating a digest of a data structure representing a compressed version of the data received from the set of at least one pair of digital twins, wherein the data structure is configured to identify in which node of the private and accessible distributed hash table the data has been stored; and a transmitter for transmitting the digest for storage on a blockchain in the blockchain network, wherein the digest of the data structure is transmitted to a buffer prior to forwarding for storage on the blockchain, the buffer selecting a sampling frequency of digest information represented by the digest of the data structure, wherein the buffer generates messages containing the digest information and transmits the messages through a secure channel for storage on the blockchain, wherein a receiver receives the messages from the buffer and accesses the private and accessible distributed hash table to verify the messages, and wherein, the buffer and the receiver use a key negotiation protocol to create a shared key between the buffer and the receiver to implement the secure channel, each time the buffer transmits a message through the secure channel for storage on the blockchain.

* * * * *